United States Patent
Li et al.

(10) Patent No.: US 11,765,634 B1
(45) Date of Patent: Sep. 19, 2023

(54) EVOLUTIONARY GAME-BASED MULTI-USER SWITCHING METHOD IN SOFTWARE-DEFINED SATELLITE NETWORK SYSTEM

(71) Applicant: CHONGQING UNIVERSITY OF POSTS AND TELECOMMUNICATIONS, Chongqing (CN)

(72) Inventors: Yun Li, Chongqing (CN); Guangfu Wu, Chongqing (CN); Mengmeng Liu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/015,101

(22) PCT Filed: Nov. 5, 2021

(86) PCT No.: PCT/CN2021/128921
§ 371 (c)(1),
(2) Date: Jan. 9, 2023

(87) PCT Pub. No.: WO2022/105621
PCT Pub. Date: May 27, 2022

(30) Foreign Application Priority Data

Nov. 17, 2020 (CN) .......................... 202011286960.0

(51) Int. Cl.
*H04W 36/08* (2009.01)
*H04W 84/06* (2009.01)
(52) U.S. Cl.
CPC ............ *H04W 36/08* (2013.01); *H04W 84/06* (2013.01)

(58) Field of Classification Search
CPC ............................. H04W 36/08; H04W 84/06
See application file for complete search history.

(56) References Cited

U.S. PATENT DOCUMENTS

| | | | |
|---|---|---|---|
| 2017/0105153 A1* | 4/2017 | Ashrafi | H04B 7/195 |
| 2023/0156826 A1* | 5/2023 | Palermo | H04W 76/10 |
| | | | 370/329 |

FOREIGN PATENT DOCUMENTS

| | | | |
|---|---|---|---|
| CN | 103795455 A | | 5/2014 |
| CN | 110312320 A | * | 10/2019 |

(Continued)

OTHER PUBLICATIONS

International Search Report for PCT/CN2021/128921 dated Jan. 20, 2022, ISA/CN.

*Primary Examiner* — Chi H Pham
*Assistant Examiner* — Ji-Hae Yea
(74) *Attorney, Agent, or Firm* — Yue (Robert) Xu; Apex Attorneys at Law, LLP

(57) ABSTRACT

The present application relates to the technical field of mobile communications, and specifically relates to an evolutionary game-based multi-user switching method in a software-defined satellite network system. The multi-user switching method comprises: respectively calculating the elevation angle and the remaining coverage time of a satellite according to obtained information, and calculating the payoff according to three basic factors, i.e., the capacity, the elevation angle, and the remaining coverage time of the satellite; a controller calculating the average payoff of users in the area, and broadcasting same to the users; when it is determined that the payoff of all the users is greater than the average payoff, ending multi-user switching; and when it is determined that the payoff of all the users is not greater than (Continued)

the average payoff, the users selecting other switching satellites having higher payoffs.

4 Claims, 7 Drawing Sheets

(56) References Cited

FOREIGN PATENT DOCUMENTS

| | | | |
|---|---|---|---|
| CN | 110312320 A | | 10/2019 |
| CN | 111525950 A | * | 8/2020 |
| CN | 111525950 A | | 8/2020 |
| CN | 112333796 A | | 2/2021 |
| WO | 2020163825 A1 | | 8/2020 |

* cited by examiner

EVOLUTIONARY GAME-BASED MULTI-USER SWITCHING METHOD IN SOFTWARE-DEFINED SATELLITE NETWORK SYSTEM

The present application is the national phase of International Patent Application No. PCT/CN2021/128921, titled "EVOLUTIONARY GAME-BASED MULTI-USER SWITCHING METHOD IN SOFTWARE-DEFINED SATELLITE NETWORK SYSTEM", filed on Nov. 5, 2021, which claims priority to Chinese Patent Application No.202011286960.0, titled "EVOLUTIONARY GAME-BASED MULTI-USER SWITCHING METHOD IN SOFTWARE-DEFINED SATELLITE NETWORK SYSTEM", filed on Nov. 17, 2020 with the Chinese Patent Office, both of which are incorporated herein by reference in their entireties.

FIELD

The present disclosure relates to the technical field of mobile communications, and in particular to a multi-user handover method based on evolutionary game in a software-defined satellite network system.

BACKGROUND

Due to limited coverage, the terrestrial cellular network cannot provide mobile services in remote mountainous areas, oceans, plateaus and other regions. In satellite communication, multiple satellites are jointly networked to form a satellite constellation which has the feature of wide coverage unlimited by regions and airspace and therefore attracts people's attention. The integration of the satellite communication networks and the terrestrial mobile communication networks is an important development trend of mobile communication. The low-earth orbit satellite system is widely concerned due to the features such as, low delay, low path loss and wide coverage. However, a time period in which a single low-earth orbit satellite covering a user terminal on the ground is limited due to the high-speed movement of the satellite relative to the ground and the movement of the user terminal, and it is required for the user terminal in communication to perform handover frequently. Generally, the satellite handover includes inter-satellite handover and beam handover.

Most researches on the satellite handover are performed based on the conventional satellite network architecture. With the wide application of the software-defined network in the terrestrial communication network, the software-defined network technology may be applied to the low-earth orbit satellite Internet to decouple a data layer and a control layer, thereby achieving flexible and convenient network architecture.

According to the satellite handover strategy in the conventional software-defined network, satellite handover is usually performed based on an elevation angle, a remaining coverage time period and the number of idle channels of a candidate satellite. There is a non-linear relationship between the elevation angle of the satellite and signal loss. A smaller elevation angle of the satellite indicates a worse channel condition and a worse communication quality. The remaining coverage time period of the satellite is related to the number of handovers and the call drop rate of the user. A longer remaining coverage time period of the satellite indicates that the satellite may serve the user for a longer time period, and thus the number of handovers and the call drop rate of the users may be reduced. The number of idle channels of the satellite indicates a load of the satellite. The greater number of the idle channels of the satellite indicates a less load of the satellite. However, the indicating the load of the satellite by the number of idle channels of the satellite has the following disadvantages. In an actual communication process, all user terminals in coverage regions of satellites may simultaneously receive messages indicating the number of idle channels of the satellites, and each of the user terminals in the regions may select a satellite with a least load to access for maximizing benefit, thus the satellite may be overloaded. Therefore, the number of idle channels of the satellite cannot indicate the load of the satellite accurately, and other indicators are required for determining the load of the satellite. In addition, according to the conventional satellite handover strategy, a satellite is selected based on the signal strength, thus the user may fail to handover. Further, the dynamic resource competitions between users are not considered in the conventional satellite handover strategy.

SUMMARY

A multi-user handover method based on evolutionary game in a software-defined satellite network system is provided according to the embodiments of the present disclosure. In the method, a multi-user handover scenario in coverage of multiple satellites is considered. Due to the motion feature of the low-earth orbit satellite, when received signal strength of a user terminal in a coverage region of a satellite is less than a predetermined threshold, the user terminal transmits a handover request for performing handover to another visible satellite to ensure continuous communication. In selecting a handover satellite, bandwidths that can be allocated to user terminals by satellites in a candidate satellite set, remaining coverage time periods of the satellites in the candidate satellite set, and elevation angles of the satellites in the candidate satellite set are comprehensively considered. A handover satellite is selected based on an evolutionary game method. With the method according to the present disclosure, the strategy is adjusted continuously to achieve equalization, effectively balancing loads of satellites, ensuring the fairness of the users to achieve optimal service qualities for all the users, and effectively reducing the handover failure rates of the users.

According to an embodiment of the present disclosure, a multi-user handover method based on evolutionary game in a software-defined satellite network system is provided. The multi-user handover method includes the following steps S1 to S5:

step S1, calculating, by each of user terminals based on obtained information, an elevation angle and a remaining coverage time period of a satellite;

step S2, calculating, by each of the user terminals based on a capacity, the elevation angle and the remaining coverage time period of the satellite and a predetermined revenue function, a revenue of the user terminal;

step S3, calculating, by a controller, an average revenue of user terminals in a region, and broadcasting the average revenue to the user terminals in the region;

step S4, determining whether the revenue of each of the user terminals is greater than the average revenue, proceeding to S5 in a case that a revenue of at least one of the user terminals is less than or equal to the average revenue, and ending a multi-user handover in a case that the revenue of each of the user terminals is greater than the average revenue; and step S5, performing handover, by each of the user terminals, to another satellite to ensure that a revenue of the user terminal after handover is greater than the revenue of the user terminal before handover; and proceeding to S2.

In some embodiments, the predetermined revenue function is a difference of an utility function of the user terminal after compensation and a cost function of the user terminal.

In some embodiments, the utility function of the user terminal after compensation is expressed as:

$$U_i(t) = \alpha \frac{V_i}{n_i(t)} - \beta \frac{\theta_i^{min}}{\theta_i} + \gamma \frac{T_i}{T_i^{max}} + \Delta u$$

where $U_i(t)$ represents an utility selecting a satellite i at a time instant t; $\alpha$ represents a weight of a load of a candidate satellite, $\beta$ represents a weight of an elevation angle of the candidate satellite, $\gamma$ represents a weight of a remaining coverage time period of the candidate satellite, and $\alpha$, $\beta$ and $\gamma$ meet a constraint condition of $\alpha+\beta+\gamma=1$; $V_i$ represents a capacity of the satellite i;) $n_i(t)$ represents the number of user terminals performing handover to the satellite i at the time instant t; $\theta_i^{min}$ represents a visible minimum elevation angle of the satellite i; $\theta_i$ represents an elevation angle of the satellite i observed by the user terminal requesting for handover; $T_i^{max}$ represents a maximum coverage time period of the satellite i; $T_i$ represents a remaining service time period of the satellite i calculated by the user terminal requesting for handover; and $\Delta u$ represents a compensation function.

In some embodiments, the cost function of the user terminal is expressed as:

$$C_i(t) = \alpha' \times n_i(t) \times t_{i,trans} + \beta' \times t_{pro}$$

where $C_i(t)$ represents a cost of the user terminal selecting a satellite i at a time instant t; $\alpha'$ represents a weight of a transmission delay of a candidate satellite, $\beta'$ represents a weight of a scheduling delay of the controller, and $\alpha'$ and $\beta'$ meet a constraint condition of $\alpha'+\beta'=1$; $t_{i,trans}$ represents a propagation delay of the satellite i at the time instant t, that is, a time length in which a handover signaling is transmitted from the satellite i to the user terminal, $$t_{i,trans} = \frac{d_{ij}}{c}, d_{ij}$$

represents a distance from the satellite i to a user terminal j, and c represents a propagation speed of an electromagnetic wave; $n_i(t)$ represents the number of user terminals performing handover to the satellite i at the time instant t; $t_{pro}$ represents the scheduling delay of the controller, and the scheduling delay of the controller comprises time spent in calculating the average revenue and determining a handover strategy.

In some embodiments, the average revenue of the user terminals in the region is calculated by using the following equation:

$$\bar{\pi}(t) = \sum_i \pi_i(t) x_i(t)$$

where $\bar{\pi}(t)$ represents an average revenue of the user terminals in the region at a time instant t, $\pi_i(t)$ represents revenues of user terminals connected to a satellite i at the time instant t, and $x_i(t)$ represents a proportion of user terminals selecting the satellite i at the time instant t.

In some embodiments, in step S5, each of the user terminals obtains a high revenue by performing a dynamic strategy adjustment process and adopts a replicator dynamics to model the dynamic strategy adjustment process, and the replicator dynamics is expressed as:

$$\dot{x}_i(t) = \sigma x_i(t)[\pi_i(t) - \bar{\pi}(t)]$$

where $\dot{x}_i(t)$ represents a replicator state of a proportion of user terminals selecting a satellite i at a time instant t; $\bar{\pi}(t)$ represents an average revenue of the user terminals in the region at the time instant t, and $\pi_i(t)$ represents revenues of user terminals connected to a satellite i at the time instant t; $\sigma$ represents a replicator dynamics parameter for controlling a rate at which a player adjusts a strategy; and the replicator dynamics meets a constraint of $$\sum_i \dot{x}_i = 0.$$

A multi-user handover method based on evolutionary game in a software-defined satellite network system is provided according to the present disclosure. According to the present disclosure, the network loads of satellites are greatly balanced, the handover failure rates of the users are reduced, and the fairness of users is ensured. With the method according to the present disclosure, a handover process based on software-defined satellite network architecture is provided. A multi-user handover problem is modeled as an evolutionary game problem, and the selection and adjustment process of the handover strategy for the users is represented by a set of differential equations. Evolutionary equilibrium is used as an equilibrium solution of the game to obtain an optimal strategy proportion, ensuring that all the users after handover can obtain optimal services, thereby ensuring the fairness of the users. In addition, since satellites are continuously moving, in order to improve the accuracy of the result, the utility function is improved by adding a compensation value in the present disclosure to reduce errors of the revenues of the users. Further, the cost of the users is designed as a function of a transmission delay and a scheduling delay, which is consistent with the actual satellite communication.

DETAILED DESCRIPTION

Technical solutions in the embodiments of the present disclosure are clearly and completely described below in conjunction with the drawings of the embodiments of the present disclosure. Apparently, the embodiments described in the following are only some embodiments of the present disclosure, rather than all of the embodiments. Any other embodiments obtained by those skilled in the art based on the embodiments in the present disclosure without any creative work fall in the protection scope of the present disclosure.

Figure 1:
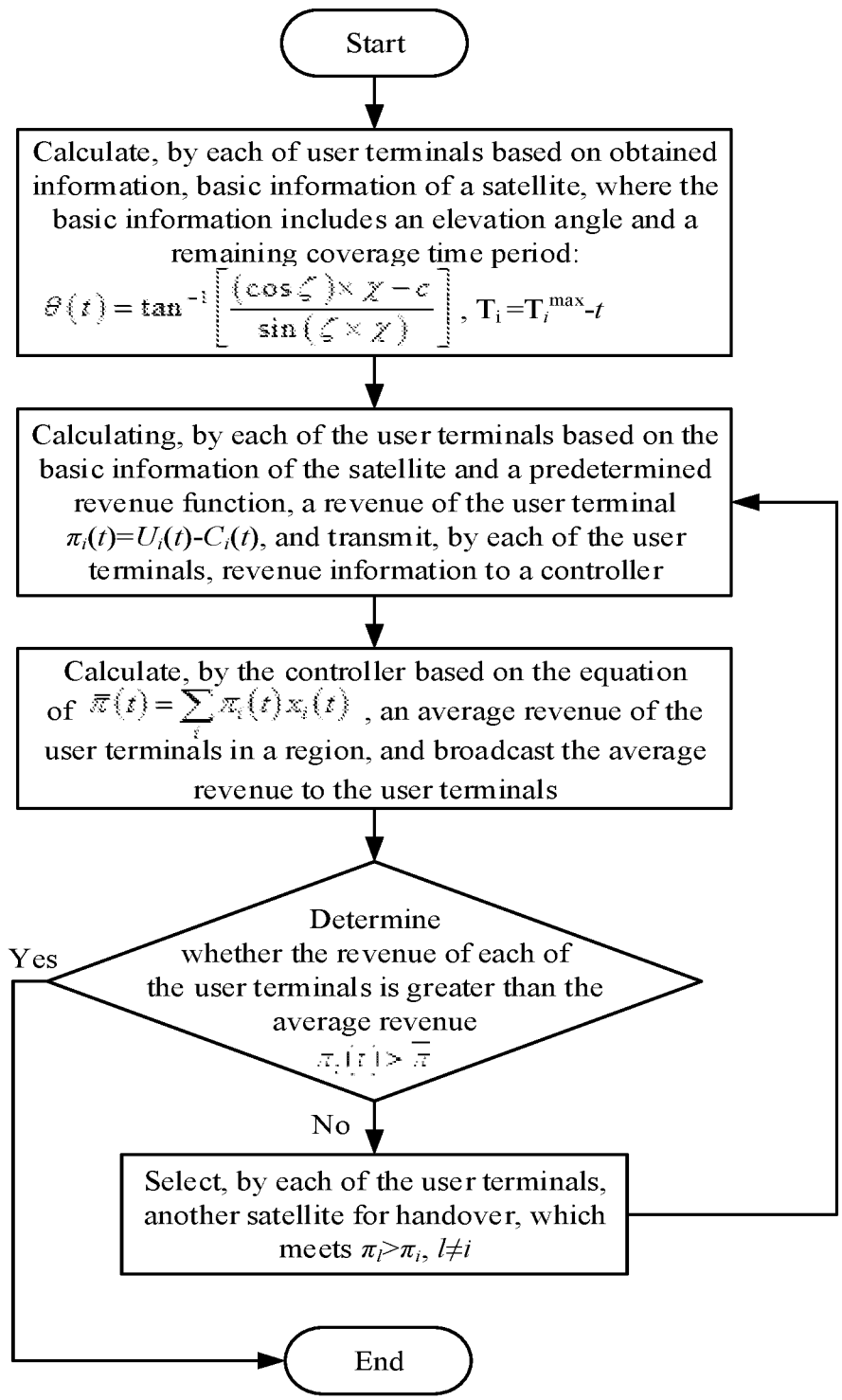
FIG. 1 shows a flow chart of a multi-user handover method based on evolutionary game in a software-defined satellite network system according to the present disclosure.

FIG. 1 shows a flow chart of a multi-user handover method based on evolutionary game in a software-defined satellite network system according to the present disclosure. As shown in FIG. 1, the multi-user handover method includes the following steps S1 to S5.

In step S1, each of user terminals calculates elevation angle information and a remaining coverage time period of a satellite based on obtained information.

In an embodiment, there is a non-linear relationship between the elevation angle of the satellite and the signal loss. A smaller elevation angle of the satellite indicates a worse channel condition and a worse communication quality. The remaining coverage time period of the satellite is related to the number of handovers and the call drop rate of the users. A longer remaining coverage time period of the satellite indicates that the satellite may serve the user for a longer time period, and thus the number of handovers and the call drop rate of the users may be reduced.

At a time instant of performing a handover, each of visible satellites transmits a pilot signal to a user terminal, the user terminal on the ground, after receiving the pilot signal from each of visible satellites, extract useful information from the pilot signal. The useful information includes longitude and latitude coordinates $(\lambda_s, \eta_s)$ of a sub-satellite point of a satellite, and a height h of the satellite. Longitude and latitude coordinates $(\lambda_u, \eta_u)$ of each of the user terminals may be obtained through GPS of the user terminal. Based on the information, a function relationship between the elevation angle of the satellite and time may be calculated as follows:

$$\theta(t) = \tan^{-1}\left[\frac{(\cos\zeta) \times \chi - c}{\sin(\zeta \times \chi)}\right]$$

In the above equation, $\zeta = \cos(bt+\psi)$, $b = w_E \cos a - w_s$, $$\psi = \cos^{-1}\left[\frac{\cos\left(\cos^{-1}\left(\frac{R_o}{R}\cos\theta_c\right) - \theta_c\right)}{\chi}\right],$$

$\chi = \cos\gamma_m$ and $$c = \frac{R_e}{R}.$$

A maximum service time period of the satellite may be calculated by using the following equation:

$$T_i^{\max} = \frac{1}{w}\arccos\left(\frac{\cos\gamma_0}{\cos\gamma_m}\right)$$

where $$w = \frac{w_s - w_E\cos a}{2}, \gamma_0 = \cos^{-1}\left(\frac{R_e}{R}\cos\theta_c\right) - \theta_c,$$

$w_E$ represents an angular speed of rotation of the earth and $\omega_E \approx 7.292115 \times 10^{-5}$ (rad/s), $w_s$ represents an angular speed of the satellite in an earth centered inertial coordinate system and $$w_S = \sqrt{\frac{\mu}{R^3}},$$

$\mu$ represents a Kepler constant and $\mu = 398600$ (km$^3$/s$^2$), a represents an inclination angle of a satellite orbit, $R_c$ represents a radius of the earth, R represents a radius of a satellite orbit, $R = R_2 + h$, h represents an orbital height, and $\theta_c$ represents a minimum elevation angle of the satellite.

A geocentric angle between a satellite i and a user terminal, observed at a time instant at which a handover is performed, may be calculated by using the following equation based on coordinates of the user terminal and longitude and latitude coordinates of a sub-satellite point of the satellite i:

$\kappa_i = \arccos[\cos\lambda_u\cos(\eta_u\eta_s)]$.

Then, an elevation angle $\theta_i$ of the user terminal at the time instant at which the handover is performed may be calculated based on a relationship between the geocentric angle and the elevation angle of the user terminal, where the relationship between the geocentric angle and the elevation angle of the user terminal is expressed as:

$$\theta_i = \arctan\left(\frac{6.61073 - \cos\kappa_i}{\sin\kappa_i}\right) - \kappa_i.$$

Then, based on the calculated elevation angle $\theta_i$ and the function relationship between the elevation angle of the satellite and time, an operation time instant t of the satellite i may be calculated, and then a remaining coverage time period $T_i$ of the satellite i is calculated.

In step S2, each of the user terminals calculates a revenue of the user terminal based on a capacity, the elevation angle information and the remaining coverage time period of the satellite and a predetermined revenue function.

In the embodiment, it is found that in an actual communication process, all user terminals in coverage regions of satellites may simultaneously receive messages indicating the number of idle channels of the satellites, and each of the user terminals in the regions may selects a satellite with a least load to access for maximizing benefit, thus the satellite may be overloaded. Therefore, the indicating the load of the satellite by the number of idle channels of the satellite has disadvantages according to the conventional technology. With a same capacity, a satellite being accessed by more users indicates that a smaller bandwidth is to be allocated for each of the users. Therefore, according to the present disclosure, bandwidths allocated for each of the users at different time instants are calculated to effectively indicate the loads of the satellites. Since an elevation angle and a remaining service time period of a satellite have little changes in a short time period, the changes of the elevation angle and the remaining service time period of the satellite with time are ignored, and an elevation angle and a remaining service time period of the satellite that are initially observed are used in the present disclosure. Therefore, a utility function for selecting a satellite by a user terminal is predetermined as:

$$U_i(t) = \alpha \frac{V_i}{n_i(t)} - \beta \frac{\theta_i^{min}}{\theta_i} + \gamma \frac{T_i}{T_i^{max}} + \Delta u$$

In above equation, $U_i(t)$ represents an utility selecting a satellite i at a time instant t; $\alpha$ represents a weight of a load of a candidate satellite, $\beta$ represents a weight of an elevation angle of the candidate satellite, $\gamma$ represents a weight of a remaining coverage time period of the candidate satellite, and $\alpha$, $\beta$ and $\gamma$ meet a constraint condition pf $\alpha+\beta+\gamma=1$; $V_i$ represents a capacity of the satellite i; $n_i(t)$ represents the number of user terminals performing handover to the satellite i at the time instant t; $\theta_i^{min}$ represents a visible minimum elevation angle of the satellite i; $\theta_i$ represents an elevation angle of the satellite i observed by the user terminal requesting for handover; $T_i^{max}$ represents a maximum coverage time period of the satellite i; $T_i$ represents a remaining service time period of the satellite i calculated by the user terminal requesting for handover; and $\Delta u$ represents a compensation function. In order to simplify the calculation, values observed at an initial time instant of a handover are used for calculation in the method. Since satellites are continuously moving, in order to improve the accuracy of the result, a compensation value is added to the utility function in the method to reduce errors in a strategy adjustment and selection process. The compensation value may refer to utility values of other satellites in a same orbital plane as the satellite i. A standard deviation $\sigma$ of utility values of other satellites in the same orbital plane as the satellite i at a time instant t is calculated, and the number of satellites having a utility value greater than an average utility value is determined. In a case that the number of satellites having a utility value greater than the average utility value is greater than the number of satellites having a utility value less than the average utility value, $$\frac{\sigma}{K}$$

is used as the compensation value; and in a case that the number of satellites having a utility value greater than the average utility value is less than or equal to the number of satellites having a utility value less than the average utility value, $$-\frac{\sigma}{K}$$

is used as the compensation value; and K represents a control factor for controlling the accuracy of the compensation value.

In some embodiments, a similarity matching operation may be performed all satellites in orbit according to the present disclosure based on the telemetry parameters of satellites, such as thermodynamic parameters, power system parameters, dynamic parameters, and operation states and operation pressures of payloads of satellites. Signal and information processing is performed based on the telemetry parameters, and features corresponding to each of the satellites is extracted by performing machine learning. Satellites with closest similarity distances are determined by performing feature classification. Utility values of the satellites with the closest similarity distances are weighted and averaged to obtain a result, and then the result is transmitted to the original satellite as a compensation value of the original satellite.

In selecting a satellite for handover, different users compete with each other. Each of the users may select a satellite to perform handover for maximizing benefit. Thus, multiple users may select a same satellite, and then the satellite may be overloaded, reducing actual communication quality of each of the users. In order to balance loads of the satellites, a cost function for the user selecting a satellite is defined as a function of the number of users selecting the satellite according to the present disclosure. In a case that the number of users selecting a satellite increases, the cost of each of the users increases and a revenue of each of the users decreases, then the users may select another satellite to perform handover to improve revenues.

Based on the above analysis, a cost of a user selecting the satellite i is defined as:

$$C_i(t) = \alpha' \times n_i(t) \times t_{i,trans} + \beta' \times t_{pro}$$

where $C_i(t)$ represents a cost of the user terminal selecting a satellite i at a time instant t; $\alpha'$ represents a weight of a transmission delay of a candidate satellite, $\beta'$ represents a weight of a scheduling delay of the controller, and a' and $\beta'$ meet a constraint condition of $\alpha'+\beta'=1$; $t_{i,\ trans}$ represents a propagation delay of the satellite i at the time instant t, that is, a time length in which a handover signaling is transmitted from the satellite i to the user terminal, $$t_{i,trans} = \frac{d_{ij}}{c},$$

$$d_{ij} = \sqrt{R_e^2(\sin\theta_i)^2 + 2hR_e + h^2} - R_e\sin\theta_i,$$

$$c = 2.99792 \times 10^8 \text{ m/s}, d_{ij}$$

represents a distance from the satellite i to a user terminal j, and c represents a propagation speed of an electromagnetic wave; $n_i(t)$ represents the number of user terminals performing handover to the satellite i at the time instant t; $t_{pro}$ represents the scheduling delay of the controller, that is, time spent for calculating an average revenue, determining a handover strategy, and the like, and $t_{pro}$ is much less than $t_{i,trans}$.

The average revenue of the user terminals in the region is calculated by using the following equation:

$$\bar{\pi}(t) = \sum_i \pi_i(t)x_i(t)$$

Each of the user terminals, at the time instant t, knows a revenue $\pi_i(t)$ obtained after performing handover to a satellite and a current average revenue $\bar{\pi}$ of a user terminal group, where the current average revenue $\bar{\pi}$ of the user terminal group is the average revenue of the terminals in the region. In a case that the revenue of the user terminal is less than the 15 average revenue, the user terminal may learns from user terminals having high revenue and adjusts a selection strategy at a time instant t+1 to obtain a high revenue. The user terminal repeats the dynamic strategy adjustment process until an equilibrium state is reached. A dynamic strategy adjustment process is modeled by using replicator dynamics. Based on the replicator dynamics, a rate at which the strategy is changed is determined. The replicator dynamics may be expressed as:

$$\dot{x}_i(t) = \sigma x_i(t)[\pi_i(t) - \bar{\pi}(t)]$$

where $\dot{x}_i(t)$ represents a replicator state of a proportion of user terminals selecting the satellite i at the time instant t; $\sigma$ represents a replicator dynamics parameter for controlling a rate at which a player adjusts a strategy; and the replicator dynamics meets a constraint of $$\sum_i \dot{x}_i = 0.$$

In step S3, a controller calculates an average revenue of the user terminals in the region, and the average revenue is broadcasted to the user terminals.

The controller calculates revenues of all the user terminals based on the utility function and the cost function, and then averages the revenues to determine the average revenue of the user terminals in the region controlled by the controller, and broadcasts the average revenue to the user terminals.

In step S4, it is determined whether the revenue of each of the user terminals is greater than the average revenue. In a case that a revenue of at least one of the user terminals is less than or equal to the average revenue, proceed to step S5. In a case that the revenue of each of the user terminals is greater than the average revenue, the multi-user handover is ended.

In step S5, each of the user terminals selects another satellite for handover to ensure that a revenue of the user terminal after handover is greater than the revenue of the user terminal before handover, and proceed to step S2.

In the embodiment, each of the user terminals adjusts the selection strategy at the time instant t+1 to obtain a high revenue. Each of the user terminals repeats the dynamic strategy adjustment process until an equilibrium state is reached.

Figure 2:
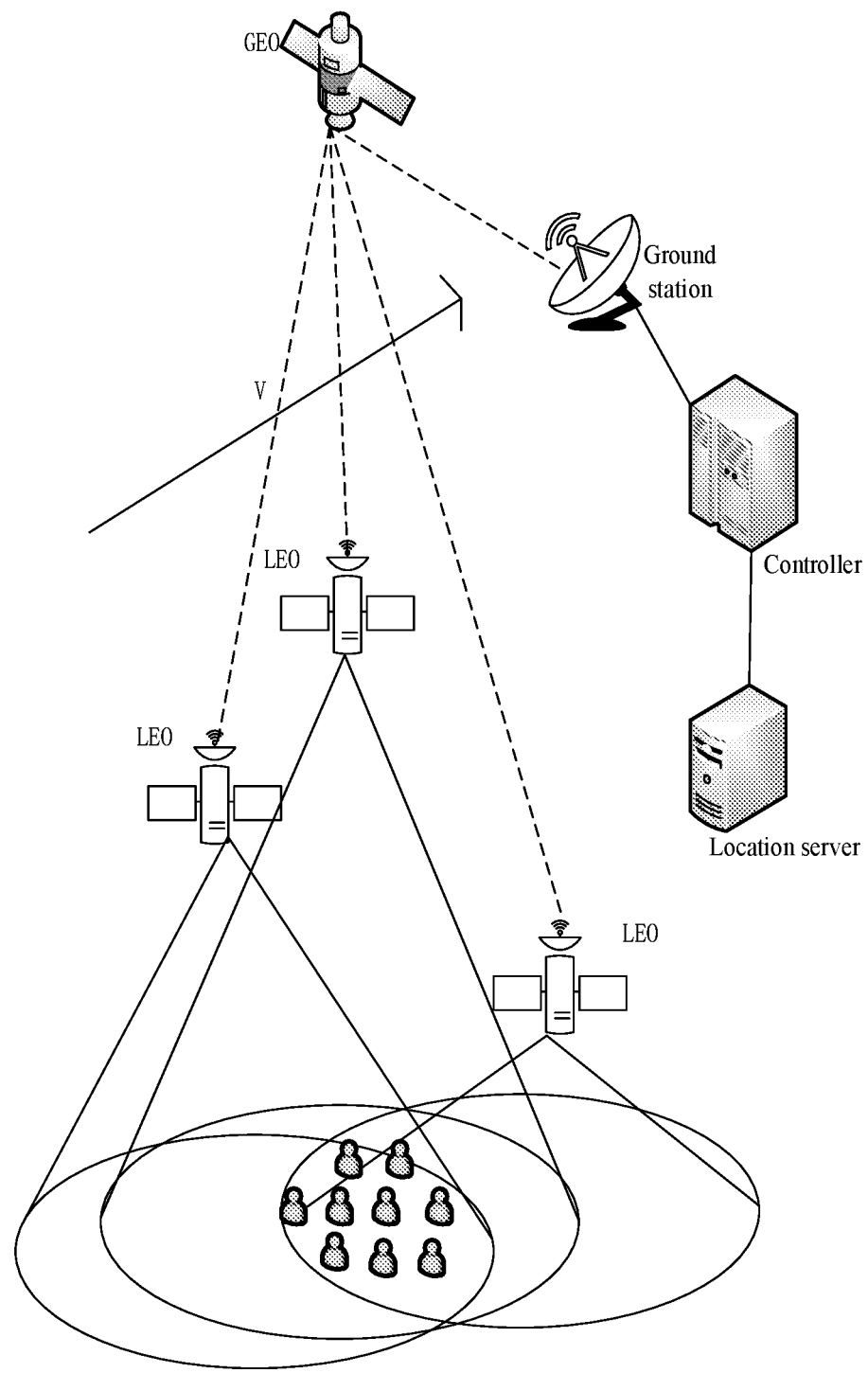
FIG. 2 shows a multi-user handover scenario under coverage of three satellites in a software-defined satellite network according to the present disclosure.

FIG. 2 shows a multi-user handover scenario under coverage of three satellites in a software-defined satellite network according to the present disclosure. As shown in FIG. 2, in this scenario, N handover users $UE_j$, $j \in \{1,2,\ldots,N\}$ competing for satellite resources form a group, each of the N users is a player, and S satellites may simultaneously provide services for the users. A satellite that may be selected by each of the players for handover is expressed as $LEO_i$, $i \in \{1,2\}$. $P_{ij}$ represents a probability of a $UR_j$ selecting a $LEO_i$, $P_{ij} \in \{1,2\}$, and $$\sum_{i=1}^{s} p_{ij} = 1, \forall j,$$

which indicates that each of the players may only select one satellite to perform handover. A group proportion indicates a proportion of the number of players selecting a strategy to the total number of the players in the group, $$x_i = \frac{n_i}{N},$$

and $$\sum_i x_i = 1.$$

$n_j$ represents the number of players selecting a strategy i, and $$n_i = \sum_{j=1}^{N} p_{ij}.$$

Group proportions for all strategies in a group form a group state, and $X = \{x_1, x_2\}$. Each of the users, as a player, may adjust a selection strategy based on revenues obtained by different selection strategies.

Figure 3:
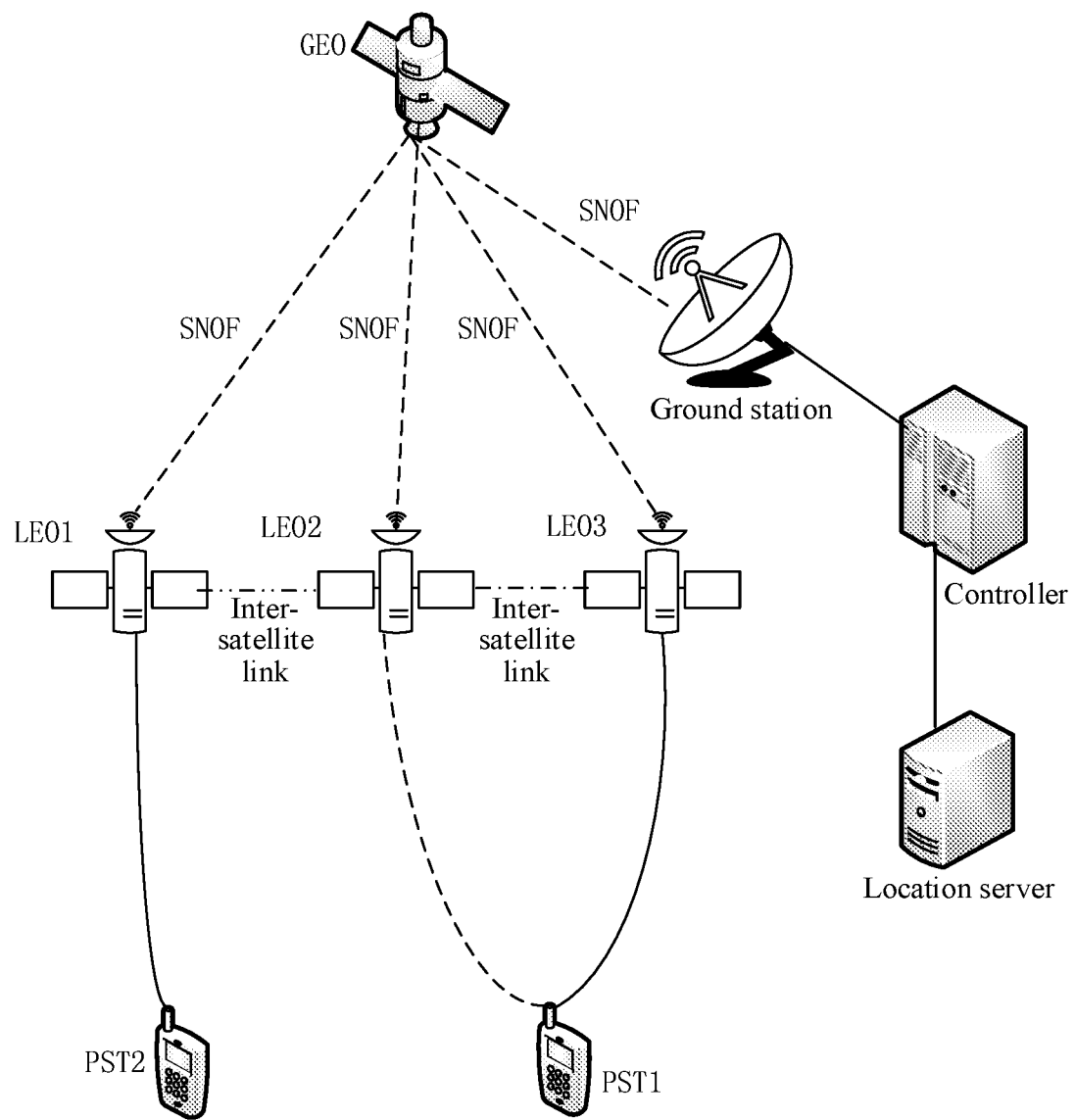
FIG. 3 is a schematic diagram showing a handover process in a software-defined satellite network according to the present disclosure.

In the software-defined satellite network architecture, a data plane includes low-earth orbit satellites only performing a forwarding function, a control plane includes a control server and a location server that are located at a ground station, and switching is performed by a controller shown in FIG. 3. Based on the software-defined satellite network, the control plane generates and transmits a flow table to low-earth orbit satellites through satellite network interface (SNOF) channels to simplify the data plane of the satellite. The controller is logically connected to the location server. The location server stores international satellite identifiers of all mobile terminals and joint addresses assigned for the mobile terminals by a gateway low-earth orbit satellite. The controller transmits instructions to the user terminals via a high-earth orbit satellite.

At a time instant of performing a handover, each of visible satellites transmits a pilot signal to a user terminal. On reception of a pilot signal from a low-earth orbit satellite, the user terminal requests a logical address from the low-earth orbit satellite to keep a link active. In a case that the user terminal is covered by multiple satellites, the user terminal selects a data link with a best communication quality as a primary data link, and other data links serve as secondary data links (where a downlink data packet may be transmitted through the primary data link or a secondary data link, and an uplink data packet may only be transmitted through the primary data link). As shown in FIG. 3, when a $PST_2$ wants to communicate with a $PST_1$, the $PST_2$ transmits a location query request to a location server, the location server transmits an address $LEO_2\_PST_1$ of the $PST_1$ to the terminal $PST_2$, then the $PST_2$ transmits data to a gateway satellite $LEO_1$ of the $PST_2$, and the $LEO_1$ forwards the data to a $LEO_2$. Thus, a calling process between $PST_1$ and $PST_2$ is established. The $PST_2$ determines the data link between the $PST_2$ and the $LEO_2$ as a primary data link, and determines links between the $PST_2$ and other satellites covering $PST_2$ as secondary data links.

Figure 4:
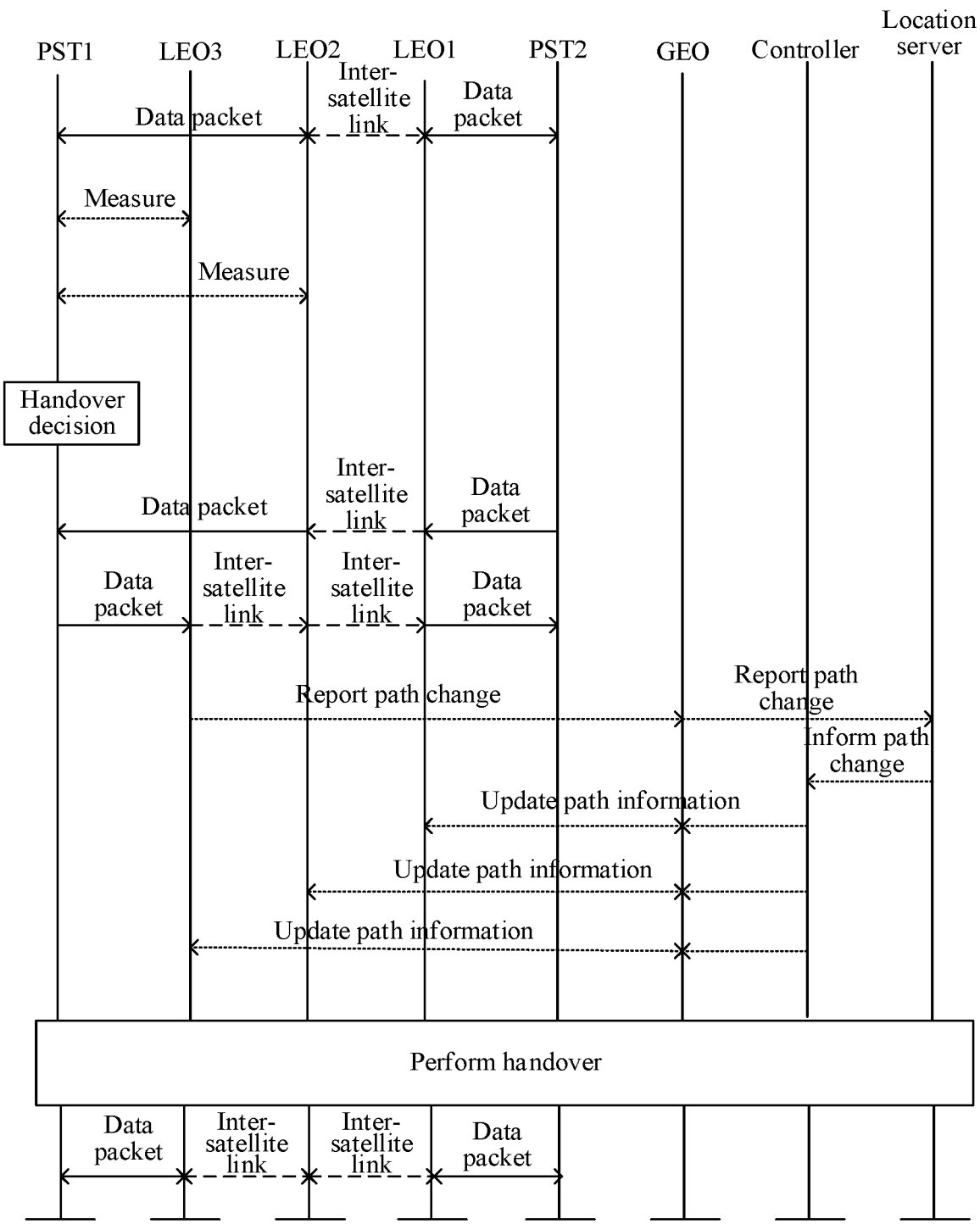
FIG. 4 is a flow chart showing a handover process in a software-defined satellite network according to the present disclosure.

Due to the motion feature of the low-earth orbit satellite, the $LEO_2$ gradually moves away from the $PST_2$, the user terminal may perform handover to ensure that the communication process is not interrupted. The user terminal determines a $LEO_3$ to be a handover satellite based on a satellite handover selection algorithm. As shown in FIG. 4, the handover process includes the following steps 1 to 7.

In step 1, in a case a user terminal determines to handover to a $LEO_3$, the user terminal determines a data link between the user terminal and the $LEO_3$ as a primary data link.

In step 2, since a location server is not informed of the handover of the user terminal, a data packet from a $PST_2$ to a $PST_1$ is still transmitted through a path of $LEO_1\_LEO_2\_PST_1$.

In step 3, the $PST_1$ transmits data and confirms an identifier through the $LEO_3$.

In step 4, the $LEO_3$ receives a data packet from the $PST_1$, detects that the user terminal has changed the primary data link of the user terminal, and transmits a path change report to the location server.

In step 5, the location server informs the controller of the path change report.

In step 6, the controller updates information related to the $PST_1$, and transmits the information to all satellites.

In step 7, the handover is completed after all information is updated. Then, all downlink data is transmitted to the $PST_1$ via the $LEO_3$.

According to the present disclosure, a handover satellite is selected based on evolutionary game, effectively balancing network loads of satellites, reducing handover failure rates of the user terminals, ensuring the communication quality of the users, thereby achieving optimal service qualities for all the users.

In the handover scenario shown in FIG. 3, it is assumed that two satellites meet a handover condition and one thousand users in the region simultaneously request for performing handover. In order to simplify the calculation, calculation is performed based on values observed by a user terminal located at a center of the region. Then, based on the above analysis, basic information of the two satellites may be obtained. The weighted indexes $\alpha$, $\beta$, and $\gamma$ are respectively set to 0.5, 0.2 and 0.3, and $\alpha'$ and $\beta'$ are respectively set to 0.7 and 0.3. The replicator dynamics parameter $\sigma$ is set to 1. A difference between the scheduling delay and the propagation delay is large, and is set to a constant value. Other simulation parameters are provided as shown in the following Table 1.

TABLE 1

| Simulation parameters | |
| --- | --- |
| Simulation parameter | Value |
| Number of satellites | 2 |
| Capacity $C_1$ of $LEO_1$ | 1500 M |
| Maximum coverage time period $T_1^{max}$ of $LEO_1$ | 734 s |
| Remaining coverage time period $T_1$ of $LEO_1$ | 534 s |
| Elevation angle $\theta_1$ of $LEO_1$ | 40° |
| Visible minimum elevation angle $\theta_1^{min}$ of $LEO_1$ | 20° |
| Distance $d_{1j}$ from $LEO_1$ to user j | 1970 km |
| Capacity $C_2$ of $LEO_2$ | 1000 M |
| Maximum coverage time period $T_2^{max}$ of $LEO_2$ | 786 s |
| Remaining coverage time period $T_2$ of $LEO_2$ | 436 s |
| Elevation angle $\theta_2$ of $LEO_2$ | 76° |
| Visible minimum elevation angle $\theta_2^{min}$ of $LEO_2$ | 20° |
| Distance $d_{1j}$ from $LEO_2$ to user j | 1449 km |

Figure 5:
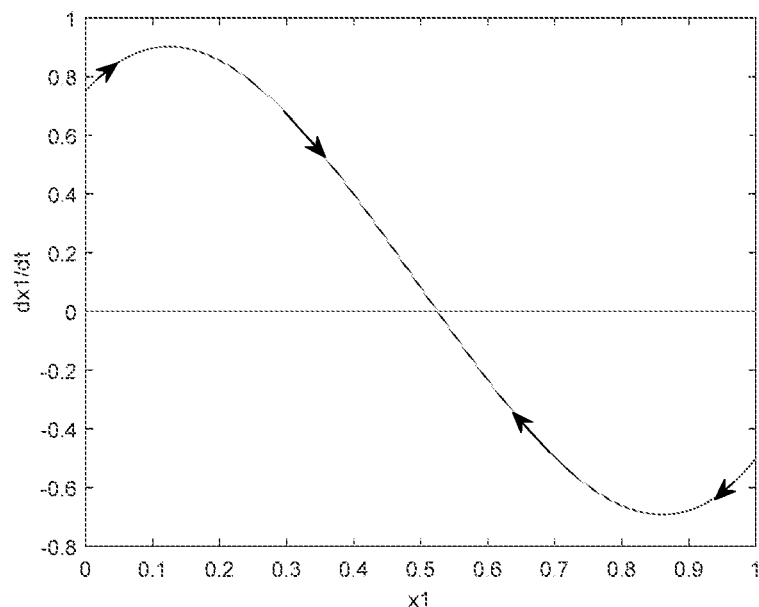
FIG. 5 is a schematic diagram of a replication dynamics phase according to the present disclosure.

FIG. 5 is a schematic diagram of a replication dynamics phase according to a first strategy (in which LEO1 is selected). It can be seen from FIG. 5 that in a dynamic strategy adjustment process by a player, $$\frac{dx_1}{dt} > 0$$

indicates that the number of players selecting the first strategy increases; and $$\frac{dx_1}{dt} < 0$$

indicates that the number of players selecting the first strategy decreases. Since $0<x_1<1$, $x_1=0.524$ at an evolution equilibrium point. That is, 52.4% of handover users select LEO1, and 47.6% of the handover users select LEO2, and all the users achieve optimal utility.

Figure 6:
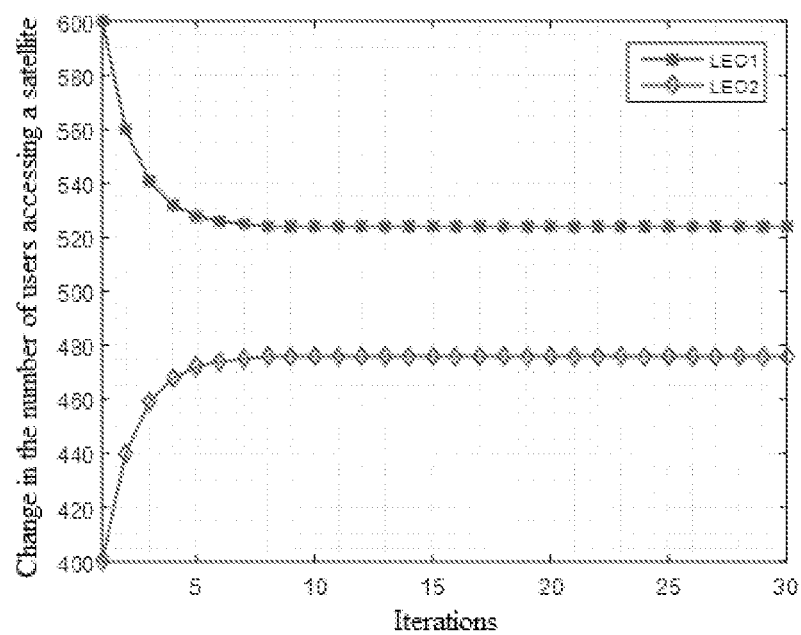
FIG. 6 is a schematic diagram showing a change in the number of users according to an embodiment of the present disclosure.

FIG. 6 is a schematic diagram showing a change in the number of users. As shown in FIG. 6, a change in the number of users accessing to two satellites is described. At the beginning, the number of users selecting a satellite 1 is much greater than the number of users selecting a satellite 2. As the revenues of the users decrease, some users adjust the selected strategies. Finally, an evolution equilibrium state is reached after multiple strategy adjustments. In addition, it may be observed from FIG. 6 that a strategy having a high initial proportion may not have a high proportion at the evolution equilibrium state, indicating the fairness of the method according to the present disclosure.

Figure 7:
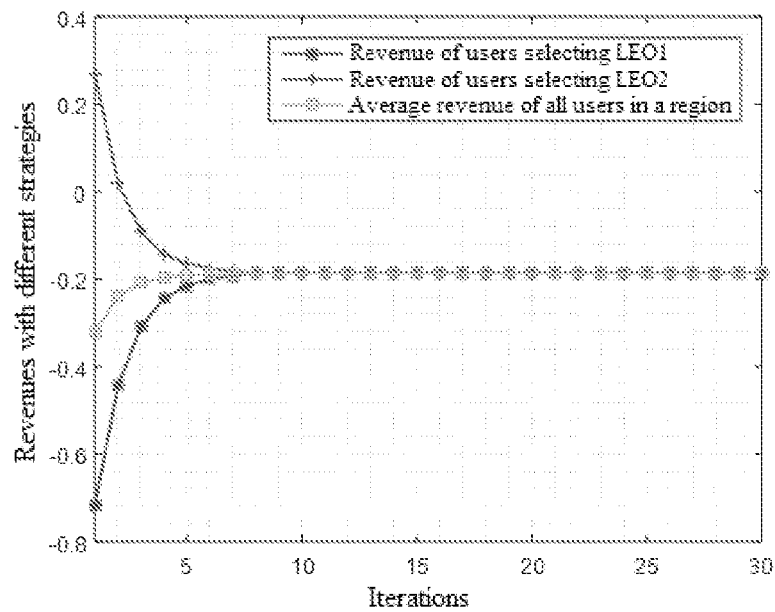
FIG. 7 is a schematic diagram showing utilities of satellites according to an embodiment of the present disclosure.

FIG. 7 is a schematic diagram showing a change in utilities of satellites. As shown in FIG. 7, a revenue of a satellite is related to the number of users accessing the satellite. After multiple games, revenues of both two satellites converge, that is, no user changes a strategy for obtaining a high revenue. All the users have a same revenue, and the system reaches an evolution equilibrium state.

Figure 8:
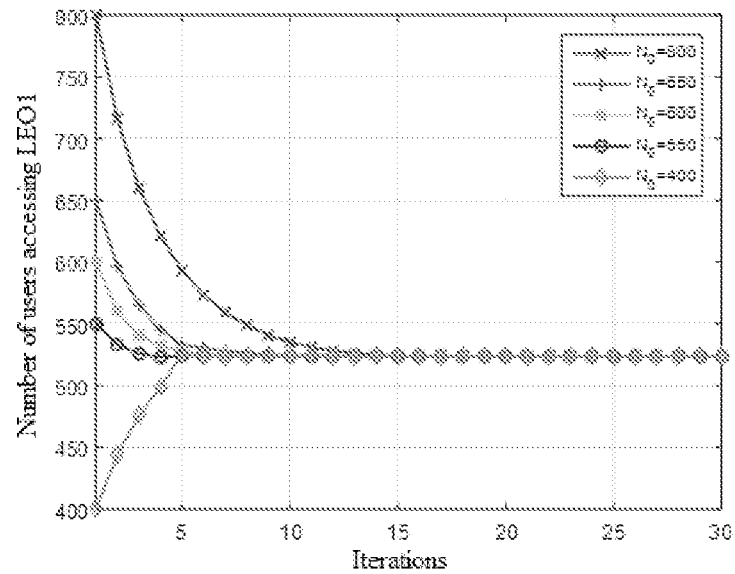
FIG. 8 is a schematic diagram showing changes in the number of users under different initial conditions according to an embodiment of the present disclosure.

FIG. 8 is a schematic diagram showing changes in the number of users accessing a satellite 1. As shown in FIG. 8, the numbers of users selecting the satellite 1 under different initial conditions are different. However, after the evolutionary game process, the numbers of users finally selecting the satellite 1 is almost the same, indicating the stability of the method.

Figure 9:
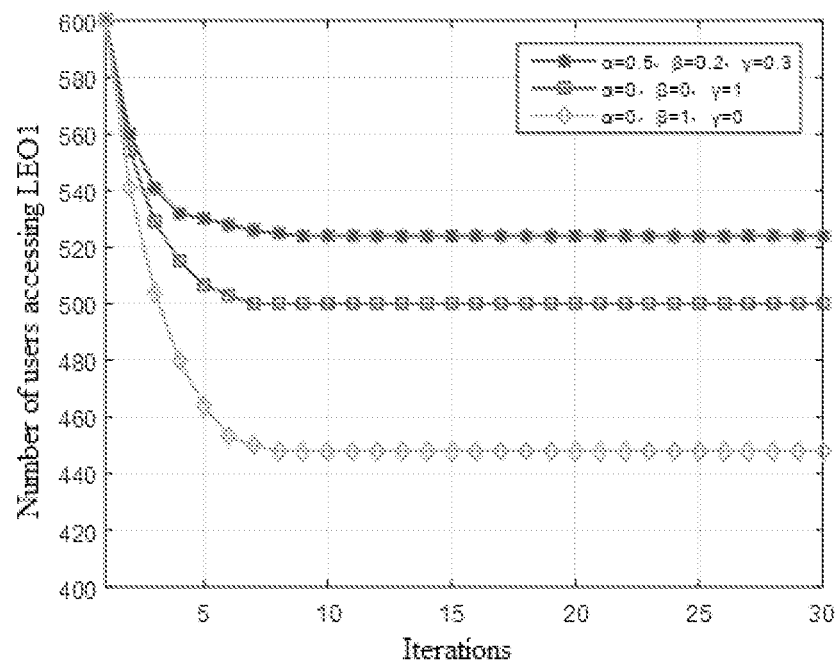
FIG. 9 is a schematic diagram showing evolutionary equilibrium with different weights according to an embodiment of the present disclosure.

FIG. 9 is a schematic diagram showing the numbers of users selecting LEO1 to perform handover with different weights. As shown in FIG. 9, the selection algorithm based on a single feature has a large convergence speed, and the selection algorithm based on multiple features has a relatively slow convergence speed, and convergence points with different weights are different.

It should be understood that in the description of the present disclosure, orientations or positional relationships indicated by the terms "coaxial", "bottom", "one end", "top", "middle", "another end", "upper", "one side", "top", "inside", "outside", "front", "center", "two ends", and the like, are orientations or positional relationships based on the drawings. These terms are merely intended for facilitating describing the present disclosure and simplifying the description, rather than indicating or implying that devices or elements defined by the terms must comply with the designated orientation, or must be constructed and operated according to the designated orientation. Therefore, the terms are not intended to limit the present disclosure.

In the present disclosure, otherwise clear specification and definition are provided, terms such as " installation", "arrangement", " connection", "fixing" and "rotation" should be understood in a broad sense, such as a fixed connection, a detachable connection or an integral connection; a mechanical connection or an electrical connection; a direct connection or an indirect connection through an intermediate media, or an internal connection inside two components or the interaction between the two components. Otherwise clear specification and definition are provided, for those skilled in the art, the specific meaning of the above terms in the present disclosure may be understood in the light of specific circumstances.

Although the embodiments of the present disclosure are shown and described, those skilled in the art should understand that various changes, modifications, substitutions and alterations may be made to these embodiments without departing from the principle and spirit of the present disclosure, and the scope of the present disclosure is defined by the claims and their equivalents.

The invention claimed is:

1. A multi-user handover method based on evolutionary game in a software-defined satellite network system, comprising:
   S1, calculating, by each of user terminals based on obtained information, an elevation angle and a remaining coverage time period of a satellite;
   S2, calculating, by each of the user terminals based on a capacity, the elevation angle and the remaining coverage time period of the satellite and a predetermined revenue function, a revenue of the user terminal;
   S3, calculating, by a controller, an average revenue of user terminals in a region, and broadcasting the average revenue to the user terminals in the region;
   S4, determining whether the revenue of each of the user terminals is greater than the average revenue, proceeding to S5 in a case that a revenue of at least one of the user terminals is less than or equal to the average revenue, and ending a multi-user handover in a case that the revenue of each of the user terminals is greater than the average revenue; and
   S5, selecting, by each of the user terminals, another satellite for handover to ensure that a revenue of the user terminal after handover is greater than the revenue of the user terminal before handover; and proceeding to S2;
   wherein the predetermined revenue function is a difference of an utility function of the user terminal after compensation and a cost function of the user terminal; and
   the utility function of the user terminal after compensation is expressed as:

$$U_i(t) = \alpha \frac{V_i}{n_i(t)} - \beta \frac{\theta_i^{min}}{\theta_i} + \gamma \frac{T_i}{T_i^{max}} + \Delta u$$

where $U_i(t)$ represents an utility selecting a satellite i at a time instant t; $\alpha$ represents a weight of a load of a candidate satellite, $\beta$ represents a weight of an elevation angle of the candidate satellite, $\gamma$ represents a weight of a remaining coverage time period of the candidate satellite, and $\alpha$, $\beta$ and $\gamma$ meet a constraint condition of $\alpha+\beta+\gamma=1$; $V_i$ represents a capacity of the satellite i; $n_i(t)$ represents the number of user terminals performing handover to the satellite i at the time instant t; $\theta_i^{min}$ represents a visible minimum elevation angle of the satellite i; $\theta_i$ represents an elevation angle of the satellite i observed by the user terminal requesting for handover; $T_i^{max}$ represents a maximum coverage time period of the satellite i; $T_i$ represents a remaining service time period of the satellite i calculated by the user terminal requesting for handover; and $\Delta u$ represents a compensation function.

2. The multi-user handover method according to claim 1, wherein the cost function of the user terminal is expressed as:

$$C_i(t) = \alpha' \times n_i(t) \times t_{i,trans} + \beta' \times t_{pro}$$

where $C_i(t)$ represents a cost of the user terminal selecting a satellite i at a time instant t; $\alpha'$ represents a weight of a transmission delay of a candidate satellite, $\beta'$ represents a weight of a scheduling delay of the controller, and $\alpha'$ and $\beta'$ meet a constraint condition of $\alpha'+\beta'=1$; $t_{i,trans}$ represents a propagation delay of the satellite i at the time instant t, that is, a time length in which a handover signaling is transmitted from the satellite i to the user terminal, $$t_{i,trans} = \frac{d_{ij}}{c},$$

$d_{ij}$ represents a distance from the satellite i to a user terminal j, and c represents a propagation speed of an electromagnetic wave; $n_i(t)$ represents the number of user terminals performing handover to the satellite i at the time instant t; $t_{pro}$ represents the scheduling delay of the controller, and the scheduling delay of the controller comprises time spent in calculating the average revenue and determining a handover strategy.

3. The multi-user handover method according to claim 1, wherein the average revenue of the user terminals in the region is calculating by using the following equation:

$$\overline{\pi}(t) = \sum_i \pi_i(t) x_i(t)$$

where $\overline{\pi}(t)$ represents an average revenue of the user terminals in the region at a time instant t, $\pi_i(t)$ represents revenues of user terminals connected to a satellite i at the time instant t, and $x_i(t)$ represents a proportion of user terminals selecting the satellite i at the time instant t.

4. The multi-user handover method according to claim 1, wherein in S5, each of the user terminals obtains a high revenue by performing a dynamic strategy adjustment process and adopts a replicator dynamics to model the dynamic strategy adjustment process, and the replicator dynamics is expressed as:

$$\dot{x}_i(t) = \sigma x_i(t)[\pi_i(t) - \overline{\pi}(t)]$$

where $\dot{x}_i(t)$ represents a replicator state of a proportion of user terminals selecting a satellite i at a time instant t; $\overline{\pi}(t)$ represents an average revenue of the user terminals in the region at the time instant t, and $\pi_i(t)$ represents revenues of user terminals connected to a satellite i at the time instant t; $\sigma$ represents a replicator dynamics parameter for controlling a rate at which a player adjusts a strategy; and the replicator dynamics meets a constraint of $$\sum_i \dot{x}_i = 0.$$

* * * * *